Jan. 2, 1945. A. FREISINGER, JR 2,366,446
BULBOUS PLANT TOPPER
Filed Nov. 19, 1942 3 Sheets-Sheet 1

INVENTOR.
Andrew Freisinger, Jr.
BY
Victor J. Evans & Co.
ATTORNEYS

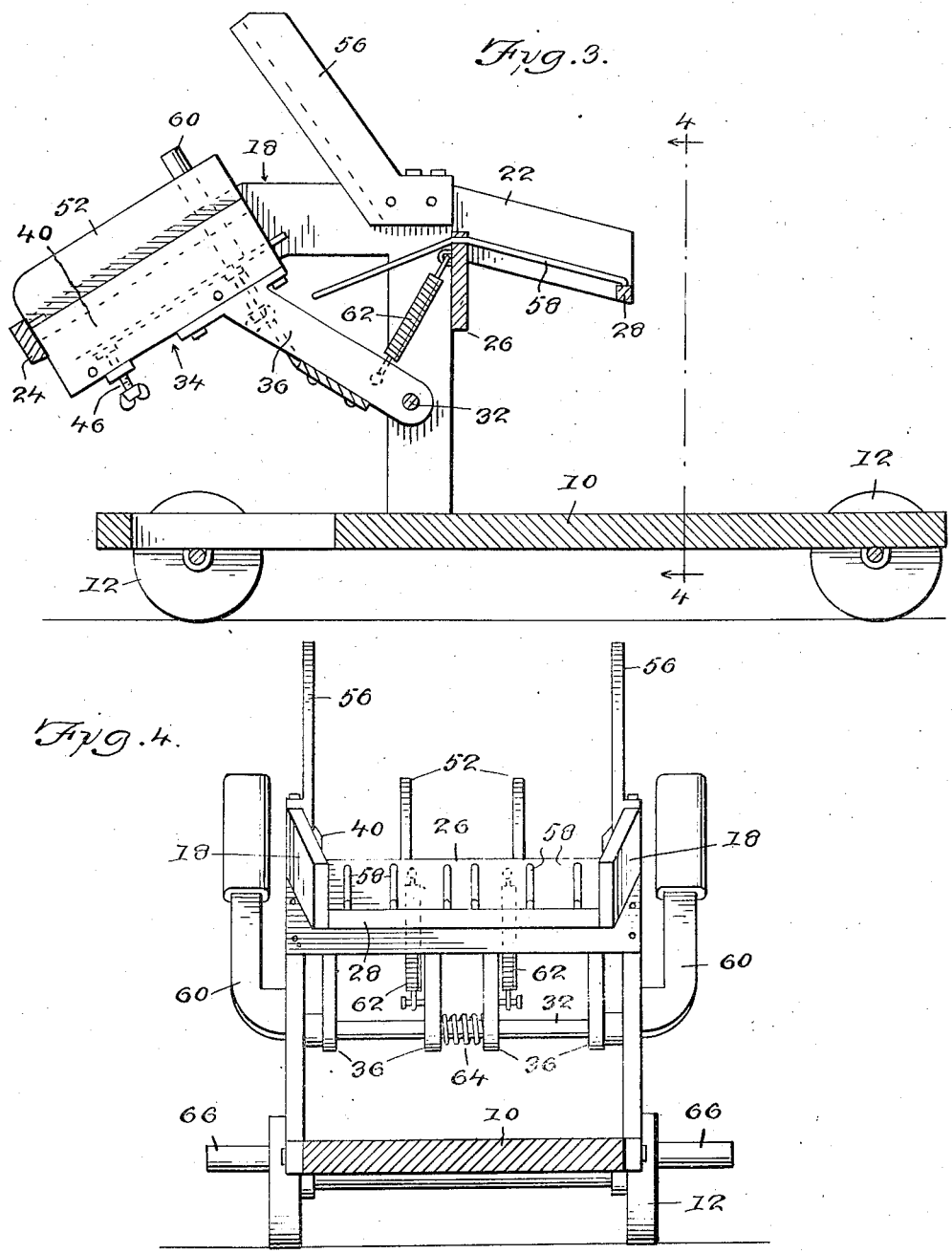

Jan. 2, 1945.   A. FREISINGER, JR   2,366,446
BULBOUS PLANT TOPPER
Filed Nov. 19, 1942   3 Sheets-Sheet 3
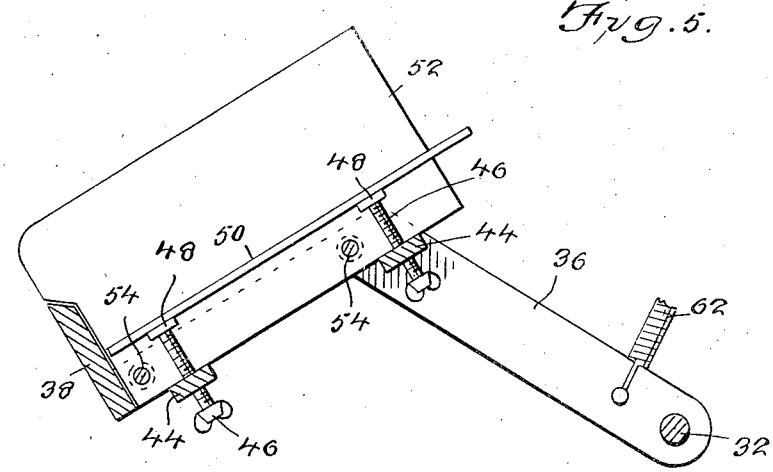
Fig. 5.
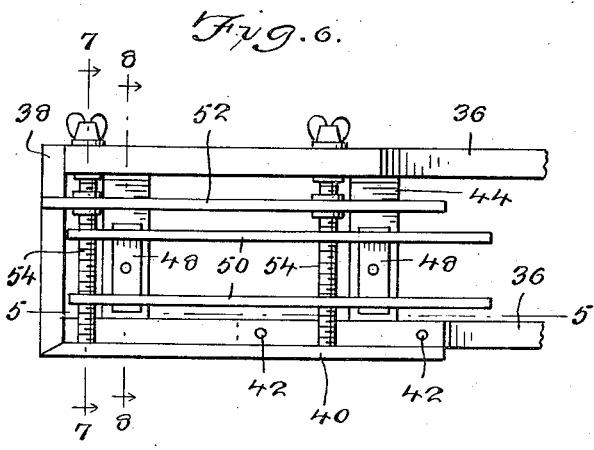
Fig. 6.
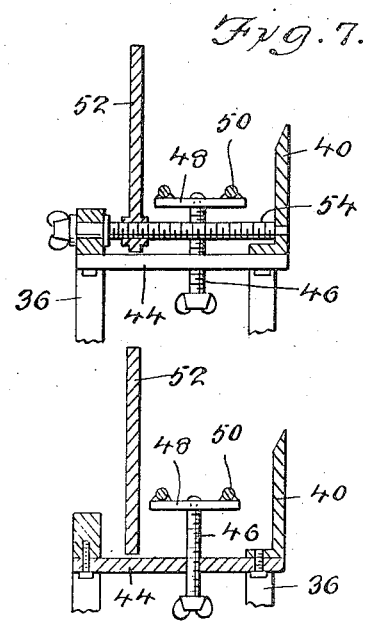
Fig. 7.
Fig. 8.
INVENTOR.
Andrew Freisinger, Jr.
BY
Victor J. Evans & Co.
ATTORNEYS Patented Jan. 2, 1945

2,366,446

UNITED STATES PATENT OFFICE 2,366,446

BULBOUS PLANT TOPPER

Andrew Freisinger, Jr., Florida, N. Y.

Application November 19, 1942, Serial No. 466,180

1 Claim. (Cl. 146—83)

My invention relates to the removal of tops from crop plants of the bulbous type, and has among its objects and advantages the provision of an improved topper embodying a wheeled carriage which may be manually moved over the field, wherein the carriage serves as a carrier for crates and the like for the topped crops. The topper includes stationary knives and crop supporting racks and knife means pivoted for coaction with the stationary knives in such manner as to dump the topped crops into the crates as a function of top removal, with the plant tops dropping on the ground along the sides of the device.

In the accompanying drawings:

Figure 3 is a longitudinal sectional view along the line 3—3 of Figure 2.

Figure 4 is a view taken from the position indicated by line 4—4 of Figure 3.

Figure 5 is a view taken along the line 5—5 of Figure 6.

Figure 6 is a plan view of one of the cutting racks.

Figure 7 is a sectional view along the line 7—7 of Figure 6, and

Figure 8 is a sectional view along the line 8—8 of Figure 6.

Figure 1:
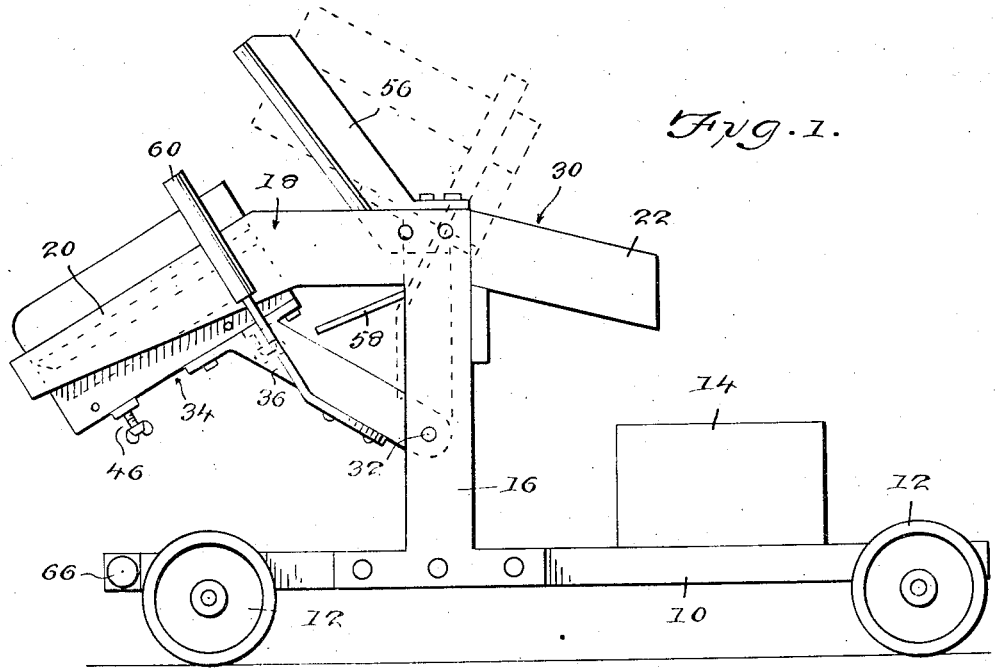
Figure 1 is a side view.
Figure 2:
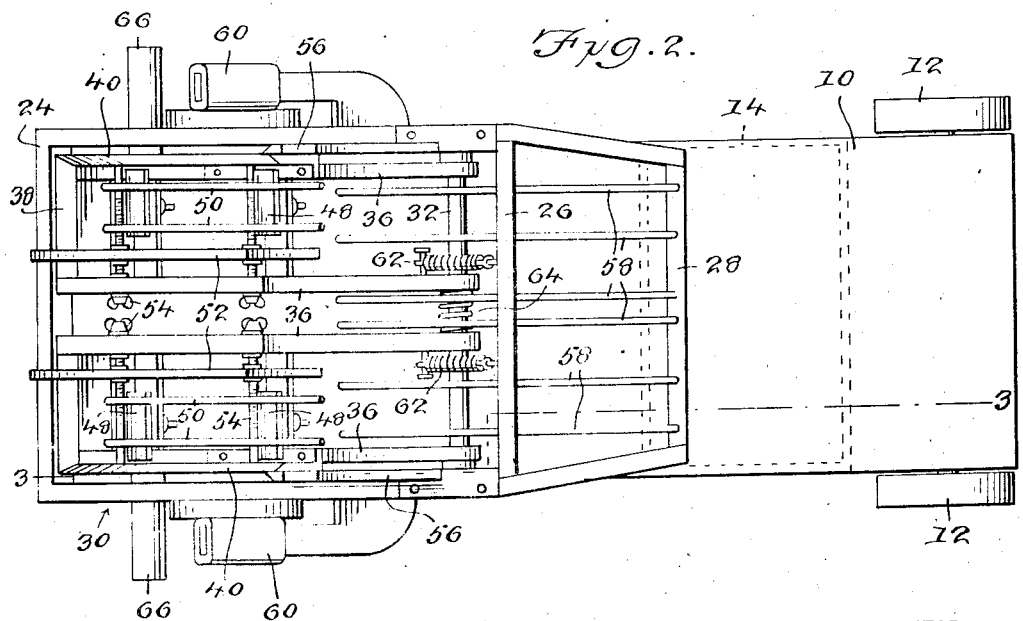
Figure 2 is a plan view.

In the embodiment of the invention selected for illustration, I make use of a platform 10 which is mounted upon wheels 12. This platform serves as a support for a crate 14 to be filled with the topped root plants.

Upright supports 16 are fixed to the platform 10, and each carries a side frame member 18 inclined downwardly and rearwardly at 20 and downwardly and forwardly at 22. The two members 18 are fixedly connected together by cross members 24, 26 and 28 to provide a frame 30.

The supports 16 carry a horizontal shaft 32 upon which are pivotally mounted two rack and cutter units 34. Normally these units lie at rest on the member 24. The two units are of identical construction so that the description of one will apply to both.

In Figures 5 through 8, the unit 34 comprises side members 36 and a connecting cross brace 38. Both members 36 are pivoted on the shaft 32. A blade 40 is bolted at 42 to one of the members 36 and connects with the brace 38, this blade lying close to one of the frame members 18 and normally with its cutting edge beneath the upper edge of that member as a protection.

Two cross pieces 44 are bolted to the inside member 36 and the blade 40. A screw 46 is threaded through each piece 44, and each bolt is rotatably connected with a plate 48. Two plant supporting rods 50 are welded to the plates 48. A wall 52 is arranged parallel to the blade 40 and is mounted on screws 54 rotatably journaled in the blade 40 and one member 36 so that the wall may be adjusted toward and away from the blade 40. The wall 52, the rods 50 and the blade 40 comprise a trough into which the bulbous parts of the plants are laid, with the tops of the plants lying across the adjacent member 18. The wall 52 and the plates 48 may be adjusted to different positions to vary the size of the trough for different types and sizes of plants.

To each of the members 18 is bolted an upwardly inclined blade 56. The two blades 56 coact with the respective blades 40 in the nature of a scissors action to sever the plant tops when the units 34 are pivoted upwardly. As the plant tops are cut, the bulbs or roots roll onto downwardly inclined rods 58 fixed to the members 26 and 28, from which they roll into the crate 14. Both sets of rods 50 and set 58 drop dirt to the ground, so that the trimmed plant roots will fall into the crate in a clean condition.

The units 34 are independently operable, and each unit includes a handle 60 fixed to one of the members 36 thereof, through the medium of which the unit may be pivoted. Tension springs 62 are attached to the member 26 and to one member 36 of the respective units 34 to aid in lifting the units.

A compression spring 64 is mounted on the shaft 32 and between the innermost members 36 of the units 34 so that the blades 40 are held in firm cutting engagement with the blades 56 at all times.

Handles 66 are attached to the platform structure 10 as an aid in pushing the device on the field. Plants may be picked from either side of the device.

Without further elaboration, the foregoing will so fully explain my invention, that others may, by applying current knowledge, readily adapt the same for use under various conditions of service.

I claim:

In a plant topping apparatus, a wheeled frame, a cutter blade fixed to the frame, a tray pivotally mounted on the frame and carrying a cutter blade, said tray being disposed to swing in such manner that the blade thereon is movable in a plane parallel with and adjacent the fixed blade to effect cutting action on the plant when the tray is moved from plant receiving to cutting and dumping position, means adjustable laterally of the blade, and means adjustable in a plane parallel with the blade, both of said means being adapted to position plants of varying size in cutting position with relation to the blade thereon.

ANDREW FREISINGER, Jr.